United States Patent [19]

McPherson et al.

[11] 4,218,184

[45] Aug. 19, 1980

[54] WINDMILL CONSTRUCTION

[75] Inventors: William E. McPherson, Drawer V, Hale Center, Tex. 79041; David W. Rowe, Plainview, Tex.

[73] Assignees: William E. McPherson, Hale Center; Gary W. Harrell, Plainview, both of Tex. ; part interest to each

[21] Appl. No.: 918,961

[22] Filed: Jun. 23, 1978

[51] Int. Cl.³ .............................................. F03D 7/06
[52] U.S. Cl. ........................................ 416/17; 416/41
[58] Field of Search ................................... 416/17, 41

[56] References Cited
U.S. PATENT DOCUMENTS

| 955,305 | 4/1910 | Bailey | 416/17 |
|---|---|---|---|
| 1,383,461 | 7/1921 | Giesler | 416/17 |
| 1,408,988 | 3/1922 | Chenoweth | 416/17 |

FOREIGN PATENT DOCUMENTS

| 1028626 | 3/1978 | Canada | 416/17 |
|---|---|---|---|
| 1486338 | 9/1977 | United Kingdom | 416/17 |

*Primary Examiner*—Everette A. Powell, Jr.
*Attorney, Agent, or Firm*—Clarence A. O'Brien; Harvey B. Jacobson

[57] ABSTRACT

A base is provided and a rotor is journaled from the base for rotation about a first upstanding axis. The rotor includes a plurality of vanes journaled therefrom for rotation about second axis spaced about and radially outwardly from the first axis and vane displacement control structure is operatively connected between the base and the vanes for proportionally angularly displacing the vanes relative to the rotor 180° in one direction during each 360° of rotation of the rotor in the opposite direction. The vanes are angularly displaced in optimum positions relative to the rotor and each other to develop maximum thrust by the vanes on the rotor responsive to fluid flow against the vanes from a predetermined side of the first axis. Fluid flow direction sensing structure is operatively associated with the windmill and connected to the vane displacement control structure for maintaining the optimum positions of the vanes relative to each other and the rotor during changes in the direction of fluid flow. Selectively operable override control structure is operatively connected to the vane displacement control structure for angularly displacing all but one of the vanes from the optimum positions thereof to feathered positions paralleling the aforementioned one vane. The override control structure includes actuating structure therefor responsive to fluid flow relative to the base in excess of a predetermined velocity.

6 Claims, 8 Drawing Figures

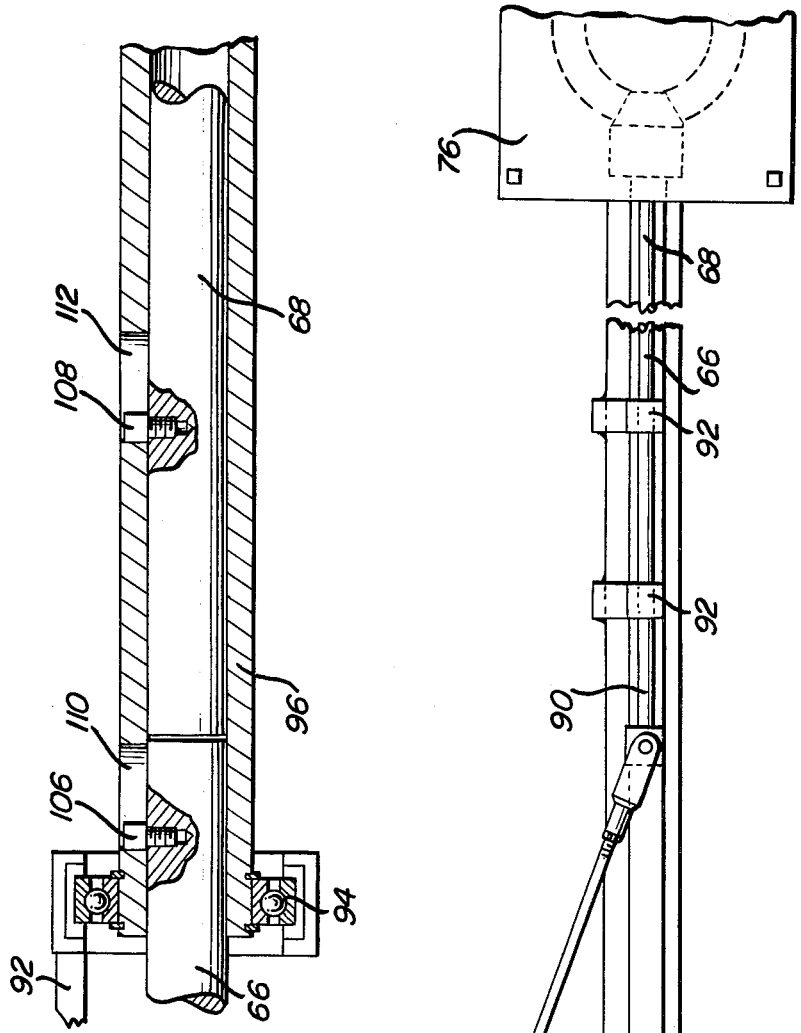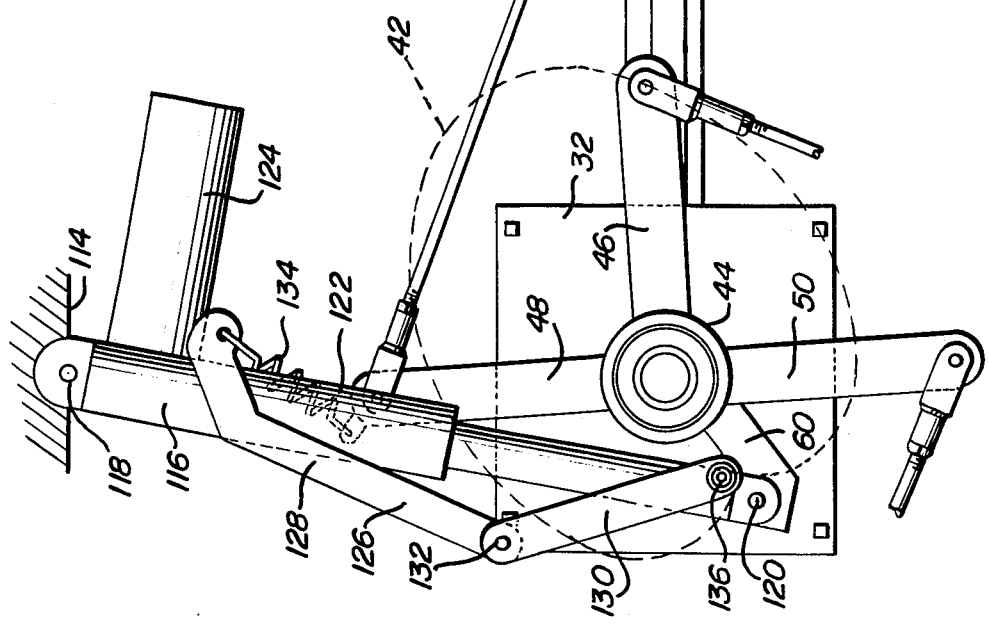

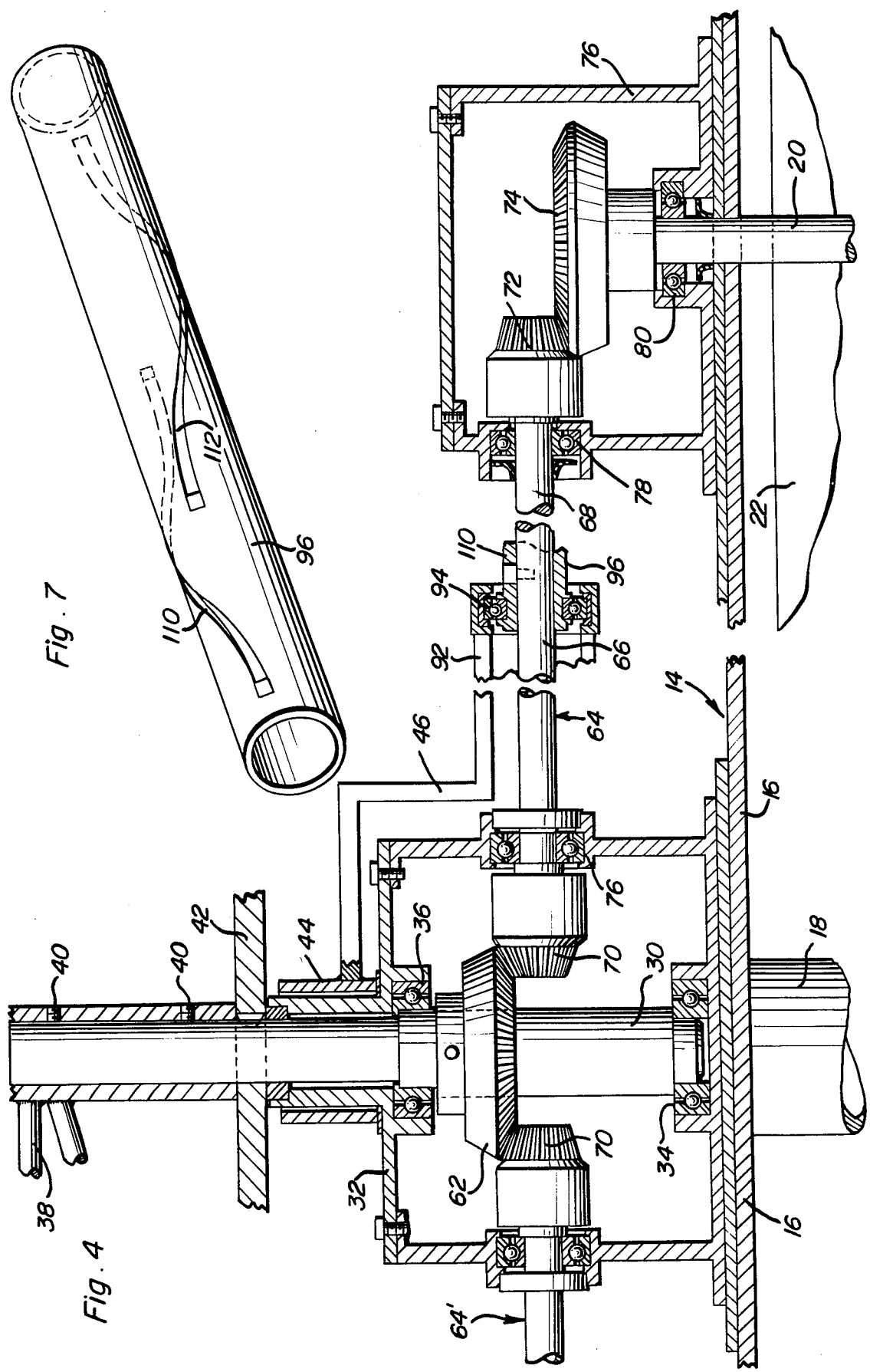

WINDMILL CONSTRUCTION

BACKGROUND OF THE INVENTION

1. Field of the Invention

Various forms of windmills have been heretofore designed. While some forms of windmills are operative to develop considerable rotational torque in prevailing wind velocities, most localities in which windmills may ultimately be erected experience considerable variations in wind velocities. Accordingly, a windmill construction operative to develop maximum torque in varying wind conditions is desired.

Further, some forms of windmills are subject to severe damage in high winds. Therefore, it is also desirable to provide a windmill including structure whereby damage to the windmill during high winds will be prevented.

2. Description of the Prior Art

Various forms of windmills including some of the general structural and operational features of the instant invention are disclosed in U.S. Pat. Nos. 189,164, 951,899, 1,467,962, 1,540,609, 2,099,617 and 2,171,732.

SUMMARY OF THE INVENTION

The windmill of the instant invention is designed primarily to develop rotary torque as a result of wind incident thereon. However, the windmill may also be utilized to harness water currents and to develop rotary torque therefrom.

The main object of this invention is to provide a windmill construction which will be capable of developing maximum rotary torque in varying velocity winds.

Another object of this invention is to provide a windmill constructed in a manner whereby damage thereto as a result of high winds incident thereon may be avoided.

Yet another object of this invention is to provide a windmill construction in accordance with the preceding objects and which will be particularly well adapted to develop rotary torque in response to low velocity wind incident thereon.

Yet another object of this invention is to provide a windmill construction including means, other than a brake assembly, for rendering the windmill inoperative to develop rotary torque in response to wind velocities in excess of a predetermined wind velocity.

A final object of this invention to be specifically enumerated herein is to provide a windmill which will conform to conventional forms of manufacture, be of simple construction and dependable in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged, fragmentary, vertical sectional view illustrating the structure of the windmill by which the vanes thereof are maintained in optimum positions relative to each other and the base of the windmill during rotation of the rotor assembly of the windmill;

FIG. 5 is a fragmentary, top plan view of the vane feathering control mechanism of the windmill in the position thereof with the vanes in parallel feathered positions;

FIG. 7 is a perspective view of one of the vane feathering mechanisms; and

FIG. 8 is a fragmentary, enlarged, vertical sectional view illustrating the operative association of the vane feathering mechanism illustrated in FIG. 7 with adjacent components of the windmill.

DETAILED DESCRIPTION OF THE INVENTION

Figure 2:
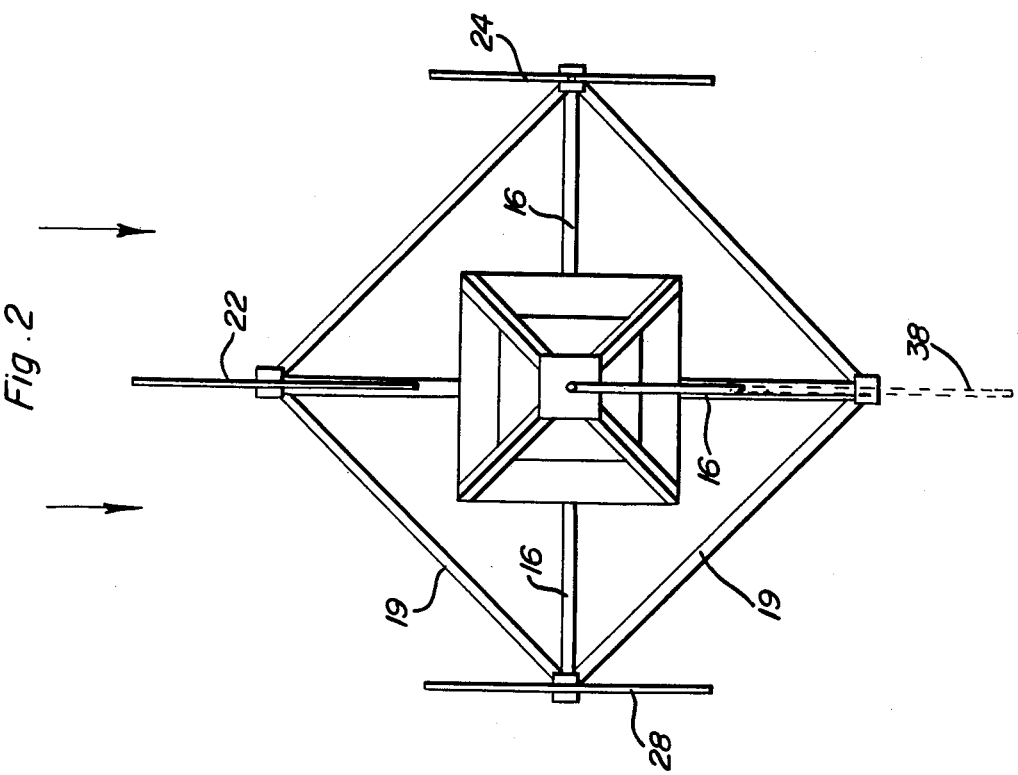
FIG. 2 is a top plan schematic view similar to FIG. 1 but illustrating the vanes of the windmill in parallel feathered positions to thereby prevent the windmill from developing rotary torque during high velocity wind conditions.

Referring now more specifically to the drawings, the numeral 10 generally designates a windmill constructed in accordance with the present invention. The windmill 10 includes an upright base 12 from which a rotor assembly referred to in general by the numeral 14 is journaled for rotation about a vertical axis. The rotor assembly includes upper and lower sets of four radial arms 16 and the inner ends of the upper and lower sets of arms 16 are anchored relative to the upper and lower ends of a central upright support member 18 of the rotor assembly 14. The outer ends of each set of arms 16 are braced relative to each other by horizontal brace members 19 extending and secured therebetween. Further, the outer ends of each pair of vertically spaced arms 16 rotatably journal upstanding support shafts 20 therefrom and the support shafts 20 have vanes 22, 24, 26 and 28 mounted thereon.

An upright shaft 30 is journaled from the upper central portion 32 of the rotor assembly 14 carried by the inner ends of the arms 16 by means of bearings 34 and 36 and a wind vane 38 is mounted on the upper end of the shaft 30 and secured in adjusted angularly displaced position thereon by means of set screws 40. In addition, a horizontal cam plate 42 is keyed to the shaft 30 for angular displacement therewith immediately below the wind vane 38 and an oscillatable control 44 is mounted on the central portion 32 for angular displacement relative thereto about an axis concentric with the axis of rotation of the shaft 30. The control 44 includes three generally radial arms 46, 48, 50 and a fourth outwardly projecting control arm 60 supported therefrom.

The shaft 30 has a beveled gear 62 mounted thereon for rotation therewith and three shaft assemblies referred to in general by the reference numeral 64 and including first and second axially aligned shaft portions 66 and 68 are provided and have bevel gears 70 on one set of ends thereof meshed with the bevel gear 62 (a 2 to 1 ratio) and bevel gears 72 on the other set of ends thereof meshed with bevel gears 74 (a 4 to 1 ratio) carried by the upper ends of the support shafts 20 from which the vanes 22, 26 and 28 are supported, the shaft assemblies 64 being journaled relative to the central portion 32 by means of bearings 76 and relative to support portions 76 provided therefor carried by the outer ends of the corresponding arms 16 by means of bearings 78. The support shafts 20 are journaled from the support portions 76 by means of bearings 80 at their upper ends and at their lower ends from the outer ends of the corresponding lower arms by means of corresponding bearings (not shown).

A fourth shaft assembly 62' is also provided, but is of one-piece construction and drivingly connects the gear 62 to the gear 74 carried by the shaft 20 from which the vane 24 is supported.

Figure 6:
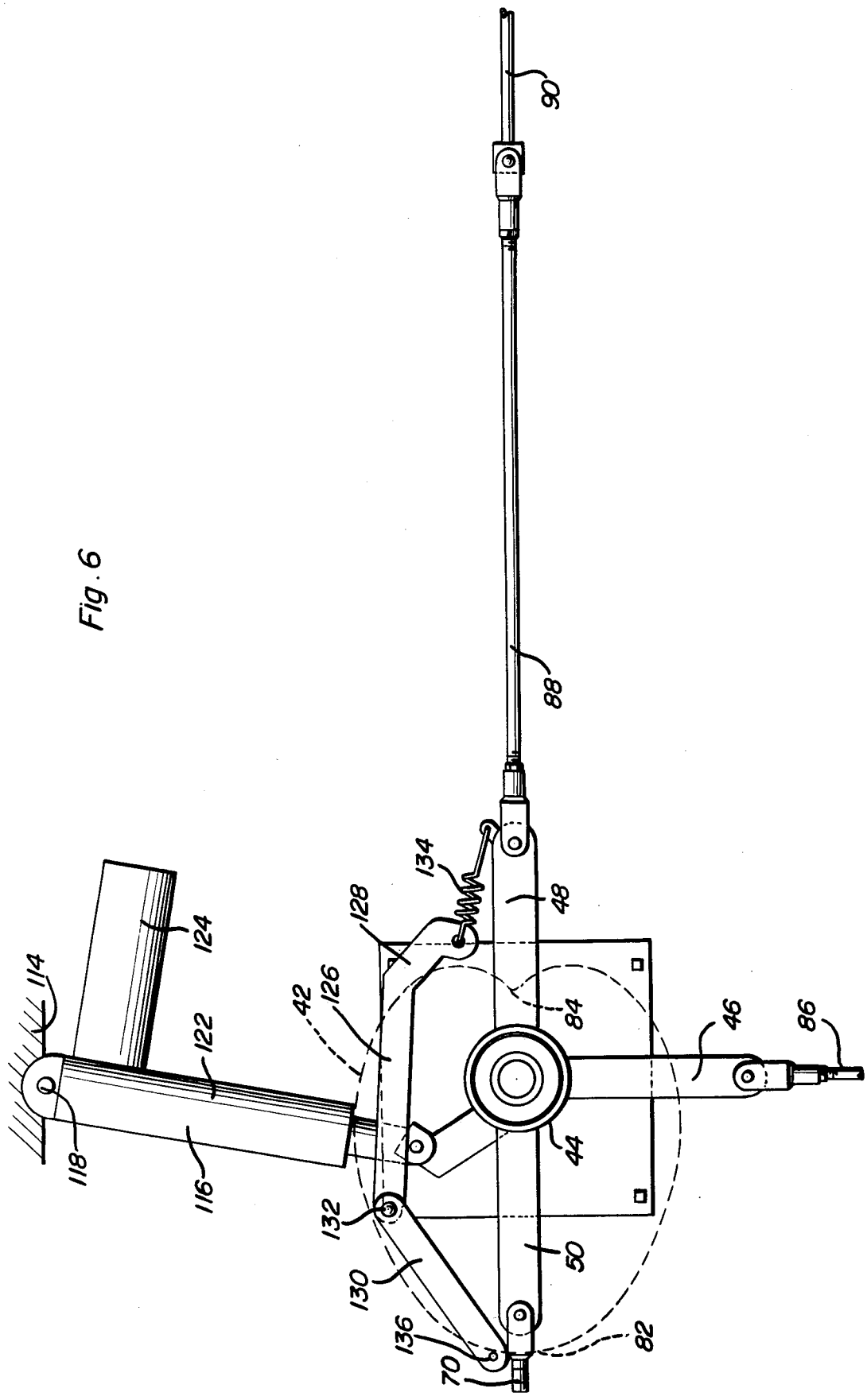
FIG. 6 is a fragmentary, enlarged, top plan view similar to FIG. 5 but illustrating the vane feathering structure in the position with the vanes optimumly positioned relative to each other to develop torque in response to wind incident upon the windmill.

The cam plate 42, as may best be seen from the dotted line representations thereof in FIGS. 5 and 6, is generally heart shaped in horizontal plan and includes a first peripheral portion 82 thereof spaced a maximum distance from the axis of rotation of the shaft 30 and a second peripheral portion 84 thereof spaced a minimum distance from the axis of rotation of the shaft 30 and defining a radially outwardly opening recess. The opposite side surfaces of the cam 42 disposed on opposite sides of the diametric plane thereof containing the peripheral portions 82 and 84 continually increase in distance from the axis of rotation of the shaft 32 from the recess 84 to the peripheral portion 82.

The outer ends of the arms 46, 48 and 50 are pivotally connected to the radial inner ends of connecting bars 86, 88 and 70 and the outer ends of the bars 88 are pivotally connected to shift bars 90 reciprocally supported from upper the arms 16 supporting the vanes 22, 26 and 28 by guides 92 and the outer ends of the shift bars 90 support journal and thrust bearings 94 therefrom anchored relative to control sleeves 96 telescoped over the adjacent ends of the corresponding shaft portions 66 and 68, the shaft portions 66 and 68 being provided with radially outwardly projecting abutments or followers 106 and 108. The control sleeve 96 operatively associated with the vane 28 includes a pair of oppositely directed helical slots 110 and 112 in which the corresponding abutments 106 and 108 are captive and the slots 110 and 112 are of 180° angular extent. Two other sleeves 96 operatively associated with the vanes 22 and 26 include similar slots of only 90° angular extent and are telescoped over the adjacent ends of the shaft portions 66 and 68 of the shaft assemblies 64 drivingly connecting the bevel gear 62 to the shafts 20 of the vanes 22 and 26. The slots in the last mentioned sleeves are relatively oppositely spiralled and the bevel gears 72 enjoy a 4 to 1 drive ratio with the bevel gears 74.

A mount 114 is supported stationary relative to the rotor assembly 14 and has one end portion of an extendible hydroelectric motor assembly 116 pivotally supported therefrom as 118. The hydroelectric motor assembly 116 has its other end pivotally connected as at 120 to the control arm 60 of the oscillatable control 44 and the motor assembly 16 comprises an extendible and retractable hydraulic cylinder 122 reversely actuated by means of a reversible electric motor 124 supported therefrom.

A bell crank 126 including lever arms 128 and 130 is pivotally mounted as at 132 from the central portion 32 and the free end of the lever arm 128 is connected to the free end of the arm 48 by means of an expansion spring 134. Further, the free end of the lever arm 130 includes a roller follower 136 journaled therefrom and rollingly engaged with the periphery of the heart-shaped cam plate 42.

A selectively manually operable switch or a centrifugal switch may be operatively associated with the motor 124 for effecting operation of the latter. The centrifugal switch would be rotor mounted and operative in response to high speed rotation of the rotor. The centrifugal switch (not shown) may be operative to supply electrical current to the motor 124 for operation thereof in one direction in order to swing the oscillatable control 44 from the position thereof illustrated in FIG. 6 to the position thereof illustrated in FIG. 5. As a result of movement of the oscillatable control from the FIG. 6 position to the FIG. 5 position, the sleeves 96 are shifted along the corresponding shaft assemblies 64 with the result that the shaft portion 68 drivingly connected to the shafts 20 of the vanes 22 and 26 are oppositely rotated 180° whereby the vane 22 and 26 are oppositely angularly displaced 45° from the positions thereof illustrated in FIG. 1 to the positions thereof illustrated in FIG. 2. Further, during the same movement of the oscillatable control 44, the sleeve 96 operatively associated with the shaft portion 68 drivingly connected to the support shaft 20 of the vane 28 effects rotation of the corresponding shaft portion 68 360° to thus angularly displace the support shaft 20 for the vane 28 90° and the vane 28 is feathered from the position thereof illustrated in FIG. 1 to the position thereof illustrated in FIG. 2.

The oscillatable control 44 rotates with the rotor assembly 14 and the cam plate 42 is stationary relative to the wind vane 38. However, upon movement of the control plate 42 from the position thereof illustrated in FIG. 6 to the position thereof illustrated in FIG. 5, the expansion spring 134 is tensioned and the roller 136, with increased force, bears inwardly on the periphery of the cam disk 42 and thus tends to seat in the recess 84 in order to terminate rotation of the rotor assembly 14. While the roller 136 on the free end of the lever arm 130 does not enjoy a positive connection with the cam plate 42, continued seating of the roller 36 within the recess 84 gradually slows down the rotor assembly 14 with the result that the rotor assembly terminates its rotation with the roller 136 seated in the recess 84. Of course, the aforementioned centrifugal switch controlling operation of the motor 124 may be of a type which automatically deactivates the motor 124 after the oscillatable mount 44 has been moved to the position thereof illustrated in FIG. 5. Further, the motor 124 may be actuated to operate in the opposite direction by any suitable additional control therefor in order to return the oscillatable control 44 to the position thereof illustrated in FIG. 6 in which the vanes 22, 24, 26 and 28 are relatively positioned as illustrated in FIG. 1.

Figure 1:
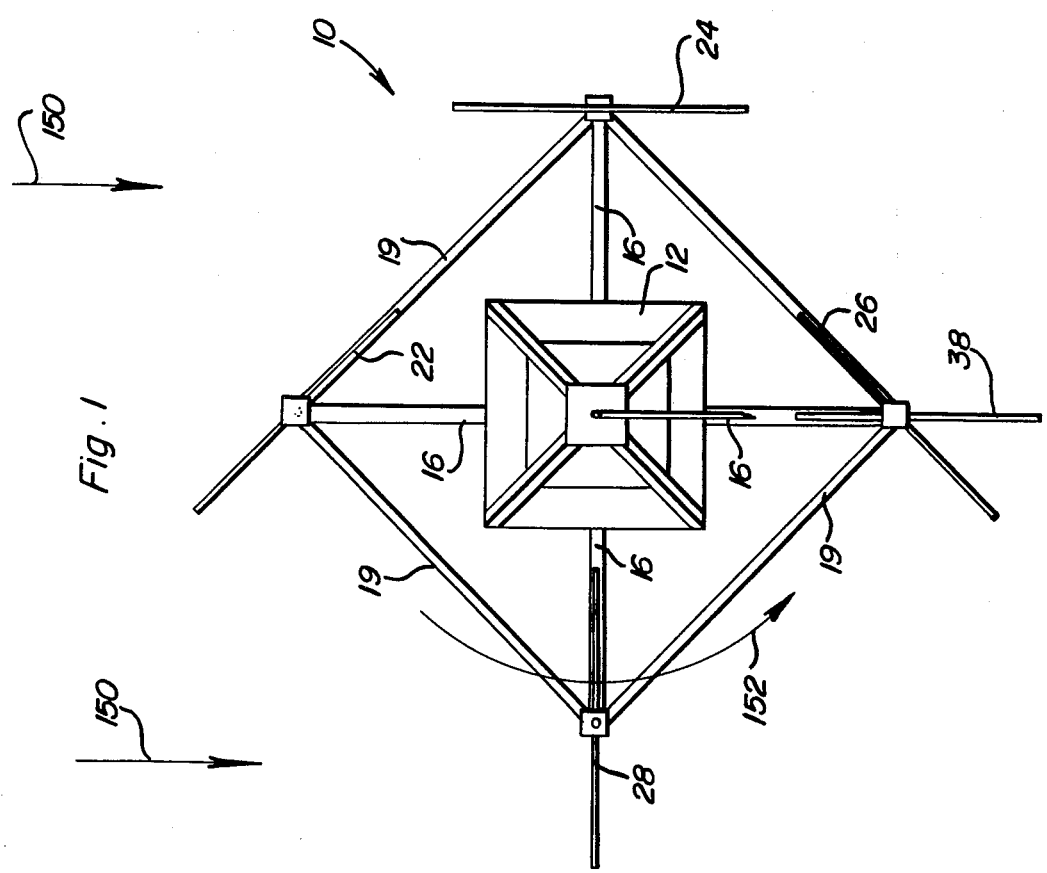
FIG. 1 is a top plan schematic view of the windmill with the four vanes thereof optimumly positioned relative to each other and the base of the windmill to develop maximum rotary torque responsive to wind incident on the windmill from a predetermined direction.
Figure 3:
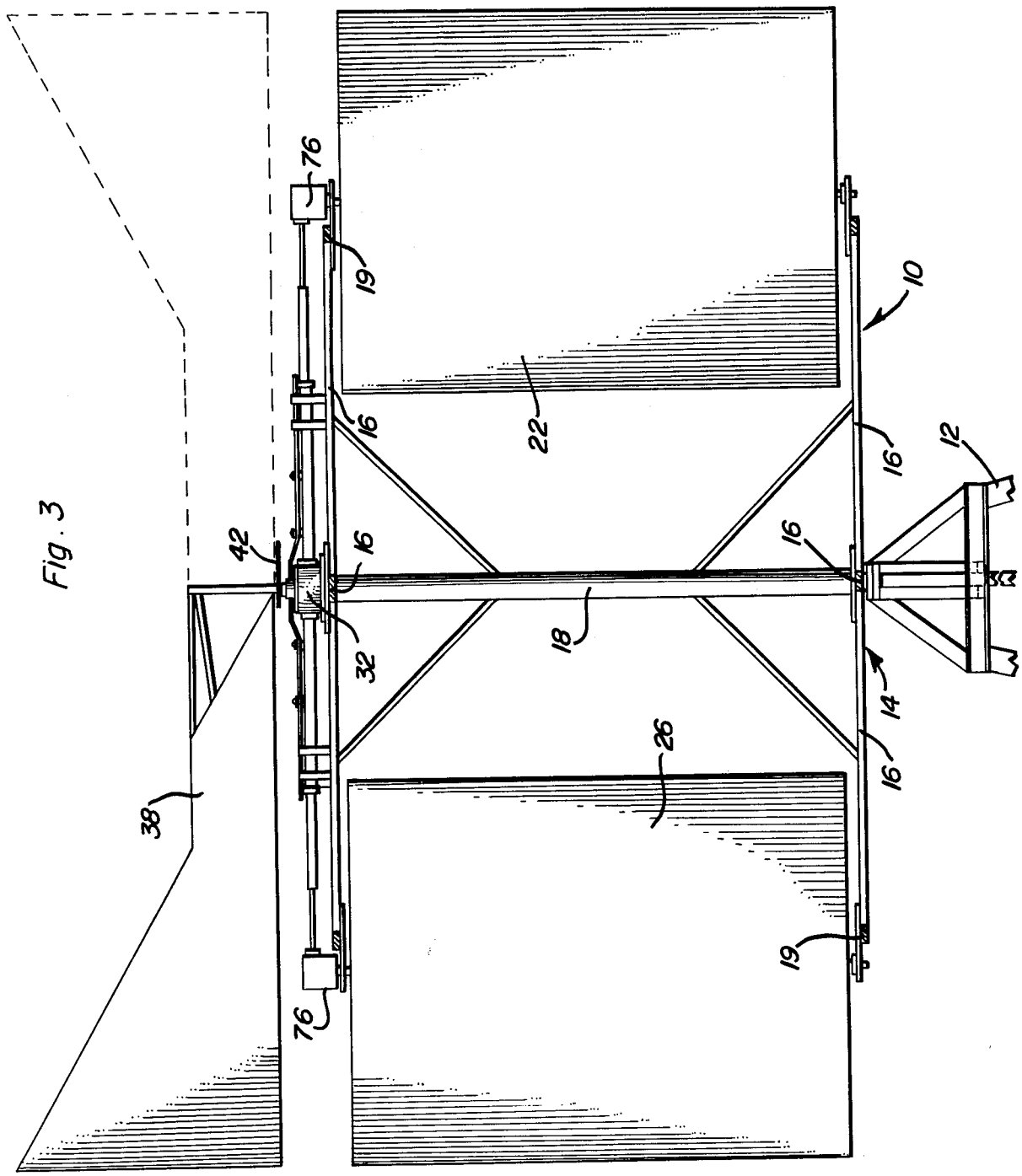
FIG. 3 is a fragmentary, enlarged, vertical sectional view of the top portion of the windmill and with an alternate position of the wind vane thereof illustrated in phantom lines.

In operation, and assuming that the vanes 22, 24, 26 and 28 are optimumly positioned relative to each other and to the base 12, wind incident upon the windmill in the direction indicated by the arrows 150 in FIG. 1 will cause rotation of the rotor assembly 14 in the direction indicated by the arrow 52 in FIG. 1. As the rotor assembly 14 is angularly displaced 90° in the direction 52, each of the vanes 22, 24, 26 and 28 will be angularly displaced relative to the rotor assembly 14 45° in a clockwise direction. Thus, each of the vanes 22, 24, 26 and 28 will remain optimumly positioned relative to the direction of the wind 150 in order that the rotor assembly 14 of the windmill 10 may develop maximum torque. When the vanes 22, 26 and 28 are feathered by angular displacement of the oscillatable control 44 from the position thereof illustrated in FIG. 6 to the position illustrated in FIG. 5, all of the vanes 22, 24, 26 and 28 are disposed in parallel relation paralleling the wind direction 150.

If during operation of the windmill the direction of the wind 150 changes, the wind vane 38 will swing parallel to the new wind direction and the resultant rotation of the bevel gear 62 will angularly displace the blades 22, 24, 26 and 28 in order that they maintain their optimum positions relative to the new wind direction.

If, however, the wind velocity increases beyond the design capacity of the windmill 10, the aforementioned centrifugal switch will be actuated in order to effect operation of the motor 124 whereby the control 44 will be angularly displaced from its position illustrated in FIG. 6 to the position thereof illustrated in FIG. 5 causing the vanes 22, 26 and 28 to be angularly displaced relative to the vane 24 into position parallel with the latter and the wind direction. Of course, by shifting the control 44 from the position of FIG. 6 to the position of FIG. 5, the spring 134 is tensioned and the roller 136 retards rotation of the rotor assembly until rotation thereof is terminated and the roller 36 is seated in the recess 84.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A windmill including a base, a rotor journaled from said base for rotation about a first axis, said rotor including a plurality of vanes journaled therefrom for rotation about second axes spaced about and radially outwardly from said first axis, vane displacement control means operatively connected between said base and vanes for proportionally angularly displacing said vanes relative to said rotor 180° in one direction during each 360° of rotation of said rotor in the opposite direction, said vanes being angularly displaced in optimum positions relative to said rotor and each other to develop maximum thrust from said vanes on said rotor to rotate the latter in said opposite direction responsive to fluid flow against said vanes from a predetermined side of said first axis, a wind direction sensing tail pivotally supported for swinging about an axis generally paralleling said first axis and operatively connected between said rotor and said vane displacement control means for maintaining the optimum positions of said vanes relative to each other and said rotor during changes in the direction of fluid flow, relative to said base, against said vanes, and with one of said vanes substantially paralleling said tail when said one vane is moving in a direction opposite to the direction in which said tail is swung, and excess rotor rotation speed override control means operatively connected between said vane displacement control means and wind direction sensing tail operative to controllably angularly displace all of said vanes other than said one vane from said optimum positions thereof to positions paralleling said one vane.

2. The combination of claim 1 wherein said vanes equal four in number and said override control means, when actuated, includes means for oppositely angularly displacing two of said vanes 45° from their optimum positions and means for displacing a third of said vanes 90° from its optimum position relative to said fluid flow direction.

3. The combination of claim 1 wherein said override control means also includes rotation retarding means operative to retard rotation of said rotor.

4. The combination of claim 3 wherein said rotation retarding means includes spring biased detent means operative to yieldingly lock said rotor against rotation as rotation of said rotor is terminated.

5. The combination of claim 1 wherein said vanes equal four in number and are equally spaced about said first axis.

6. The combination of claim 1 wherein said override control means includes actuating means therefor responsive to angular velocity of said rotor above a predetermined angular velocity.

* * * * *